(12) United States Patent
Miyamoto et al.

(10) Patent No.: US 7,557,973 B2
(45) Date of Patent: Jul. 7, 2009

(54) OPTICAL SCANNING DEVICE AND IMAGE FORMING APPARATUS PROVIDED WITH THE SAME

(75) Inventors: Teruyuki Miyamoto, Osaka (JP); Koji Izumi, Osaka (JP)

(73) Assignee: Kyocera Mita Corporation (JP)

( * ) Notice: Subject to any disclaimer, the term of this patent is extended or adjusted under 35 U.S.C. 154(b) by 221 days.

(21) Appl. No.: 11/807,958

(22) Filed: May 31, 2007

(65) Prior Publication Data
US 2007/0279719 A1    Dec. 6, 2007

(30) Foreign Application Priority Data
Jun. 2, 2006    (JP)    ............... 2006-154526

(51) Int. Cl.
G02B 26/08    (2006.01)
B41J 2/435    (2006.01)

(52) U.S. Cl. ........................ 359/198; 347/263
(58) Field of Classification Search ............ None
See application file for complete search history.

(56) References Cited

U.S. PATENT DOCUMENTS 5,281,997 A  *  1/1994  Araki et al. .............. 399/118
6,243,128 B1 *  6/2001  Yamakawa .............. 347/263
7,411,710 B2 *  8/2008  Oda ........................ 359/198
2001/0031152 A1  10/2001  Kaneko et al.

FOREIGN PATENT DOCUMENTS

JP    2001-242671    9/2001
JP    2004-170755    6/2004

* cited by examiner

Primary Examiner—James Phan
(74) Attorney, Agent, or Firm—Gerald E. Hespos; Anthony J. Casella (57) ABSTRACT

An optical scanning device has a light source for irradiating a beam; a scanning optical system for allowing the beam to deflectively scan a scanned surface; and a housing for supporting the light source and the scanning optical system. The housing includes opposed facing first and second side surfaces. A first frame faces the first side surface or a surface near the first surface. A second frame faces the second surface of the housing. A first support supports the first side surface or a side surface near the same at two points with the first frame. A second support supports the second side surface at one point with the second frame. A forcible contact mechanism generates a biasing force for urging the first side surface toward the first frame; and an adjusting mechanism on the second support adjusts a deviation of the housing over a horizontal plane.

18 Claims, 9 Drawing Sheets

OPTICAL SCANNING DEVICE AND IMAGE FORMING APPARATUS PROVIDED WITH THE SAME

BACKGROUND OF THE INVENTION

1. Field of the Invention

The present invention relates to an optical scanning device used as an optical system for writing, and an image forming apparatus, such as a printer, a facsimile machine and a copier, provided with the optical scanning device.

2. Description of the Related Art

An optical scanning device in which a polygon mirror is rotated with a motor and a laser light beam is irradiated to polygonal reflective surfaces of the polygon mirror for scanning is used in an image forming apparatus such as a copier and a laser printer.

When such optical scanning device is mounted in an image forming apparatus, a deviation of a main scanning direction of the laser light beam irradiated from the optical scanning device to a photoconductive drum is finely adjusted to ensure the perpendicularity of an image to the photoconductive drum. Conventionally, a folding mirror provided in the optical scanning device has been adjusted for such fine adjustment. However, especially in a color image forming apparatus, it has been necessary to adjust a plurality of folding mirrors in the optical scanning device for respective colors. Therefore, operations of assembling an image forming apparatus have been complicated and taking a long time, thereby causing a disadvantage in the aspect of manufacturing costs.

Therefore, various configurations to do easy correction of a deviation of a laser light-beam in an optical scanning device have been devised. For example, Japanese Patent Unexamined Publication No. 2004-170755 (D1) discloses a color image forming apparatus in which a deviation and distortion of an image bearing member is detected by using a detected registration misalignment for respective colors, and a laser light is irradiated at a timing and an exposure amount to correct the deviation and distortion and eliminate the registration misalignment.

Further, Japanese Patent Unexamined Publication No. 2001-242671 (D2) discloses an image forming apparatus in which each set of a photoconductive drum and a scanner of a plurality of imaging units is made in a pressed contact with a frame member to thereby accurately position the plurality of imaging units without performing any adjustment of the relative positional relationship therebetween.

However, the configuration disclosed in the D1 reference needs a detector for detecting a registration misalignment and a mechanism for adjusting the scanning timing and exposure amount of a laser light beam, consequently having a complicated control mechanism. Further, in the configuration disclosed in the D2 reference, the positional relationship between the photoconductive drum and the scanner is dependent on the accuracy in dimensions of the frame member, thus causing a problem that the positional relationship adjustment cannot be accomplished when the frame member is deformed.

SUMMARY OF THE INVENTION

An object of the present invention is to provide an optical scanning device which makes it possible to easily adjust a deviation of a main scanning direction of a scanning light beam with respect to an image bearing member, and is simpler in construction and lower in costs.

An optical scanning device according to one aspect of the present invention achieving this object, comprises: a light source member for irradiating a light beam; a scanning optical system for allowing the light beam to defectively scan a surface to be scanned; a housing for supporting the light source member and the scanning optical system, the housing including a first elevation wall and a second elevation wall facing the first elevation wall; a first frame facing the first elevation wall of the housing or a part near the first elevation wall; a second frame facing the second elevation wall of the housing; a first support portion for supporting the first elevation wall or the part near the first elevation wall with the first frame at two points; a second support portion for supporting the second elevation wall with the second frame at a single point; a forcible contact mechanism for generating a biasing force for urging the first elevation wall onto the first frame; and an adjusting mechanism provided in the second support portion for adjusting a deviation of the housing over a horizontal plane.

Further, an image forming apparatus according to another aspect of the present invention includes: an image bearing member for bearing a toner image corresponding to an electrostatic latent image; and an optical scanning device for irradiating a beam to a surface of the image bearing member to form an electrostatic latent image. The optical scanning device has the above-described configuration.

These and other objects, features and advantages of the present invention will become more apparent upon reading of the following detailed description along with the accompanied drawings.

DETAILED DESCRIPTION OF THE PREFERRED EMBODIMENTS

Figure 1:
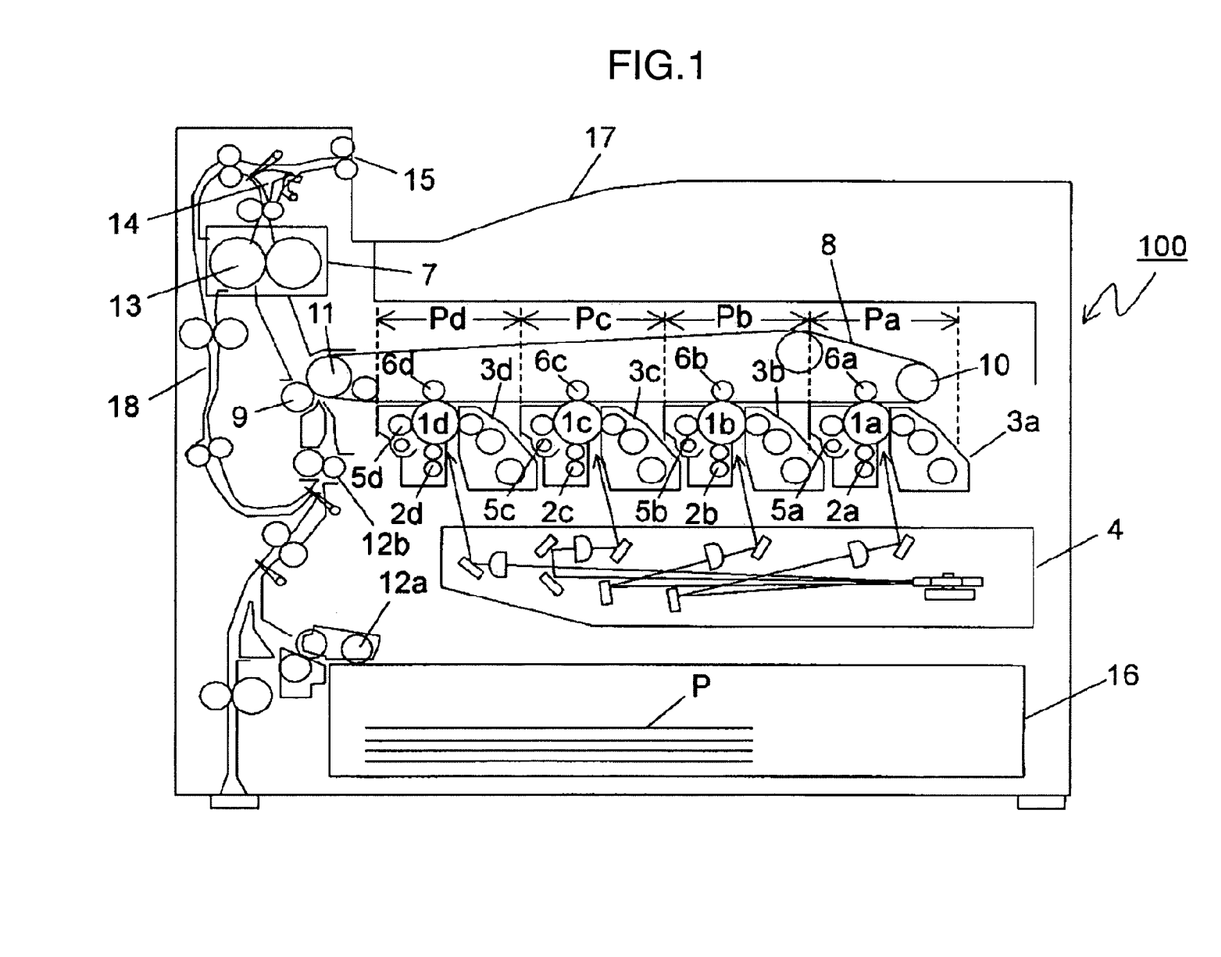
FIG. 1 is a sectional view schematically showing an internal configuration of a color image forming apparatus including an optical scanning device according to an embodiment of the present invention.

Hereinafter, an embodiment of the present invention will be described with reference to the drawings. FIG. 1 is a sectional view schematically showing a tandem-type color image forming apparatus mounted with an optical scanning device, embodying the present invention. In a main body of a color image forming apparatus 100, there are provided four image forming units Pa, Pb, Pc, Pd aligned in sequence from the upstream (right hand side in FIG. 1) in a sheet conveyance direction. These image forming units Pa to Pd correspond to images of four colors (cyan, magenta, yellow and black) respectively, and form images of cyan, magenta, yellow and black successively following steps of charging, exposing, developing and transferring.

These image forming units Pa to Pd are provided with photoconductive drums 1a, 1b, 1c, 1d respectively for bearing visible images (toner images) of respective colors. Toner images formed on the photoconductive drums 1a to 1d are rotated in a clockwise direction in FIG. 1 by a driving mechanism (unillustrated) and transferred successively to an intermediate transferring belt 8 which moves while being in contact with each image forming unit. This toner image is once transferred to a recording sheet P at a transfer roller 9, and fixed onto the recording sheet P at a fixing device 7. Thereafter, the recording sheet P is discharged from the main body of the apparatus. Image forming processings are performed to each of the photoconductive drums 1a to 1d while the photoconductive drums 1a to 1d are rotated in a counter-clockwise direction.

Recording sheets P onto which a toner image is to be transferred are stored in a sheet cassette 16 located in a lower portion of the apparatus. A recording sheet P is conveyed to the transfer roller 9 via a sheet-feeding roller 12a and a pair of registration rollers 12b. The intermediate transferring belt 8 is made up of a dielectric resin, and is formed into an endless belt by overlapping and bonding the opposite ends of a sheet. A belt having no seam or seamless belt may be used.

Next, the image forming units Pa to Pd will be described. In a periphery of or below the rotatable photoconductive drums 1a to 1d, there are provided charging devices 2a, 2b, 2c, 2d for charging the photoconductive drums 1a to 1d, an optical scanning device 4 for exposing each of the photoconductive drums 1a to 1d in accordance with image information, developing units 3a, 3b, 3c, 3d for forming toner images on the photoconductive drums 1a to 1d respectively, and cleaning devices 5a, 5b, 5c, 5d for removing developer (toner) particles remained on the photoconductive drums 1a to 1d.

When a user instructs a start of image forming operation, surfaces of the photoconductive drums 1a to 1d are uniformly charged by the charging device 2a~2d. After that, the optical scanning device 4 irradiates a laser light beam to the photoconductive drums 1a to 1d to form electrostatic latent images corresponding to the image signal on the photoconductive drum 1a to 1d respectively. A predetermined amount of toner particles of respective colors including cyan, magenta, yellow and black are supplied from a supplying device (unillustrated) to the developing units 3a to 3d respectively. Toner particles are supplied onto the photoconductive drums 1a to 1d by the developing units 3a to 3d respectively and attracted thereto electrostatically to consequently form toner images corresponding to the electrostatic latent images formed by the exposure of the optical scanning device 4.

Then, after an electric field is applied at a predetermined transfer voltage to the intermediate transferring belt 8, the transfer rollers 6a to 6d transfer onto the intermediate transferring belt 8 the toner images of cyan, magenta, yellow and black formed on the photoconductive drums 1a to 1d. These four color images are formed in a predetermined positional relationship set in advance for a predetermined full-color image forming. Thereafter, for subsequent electrostatic latent image forming, the cleaning devices 5a to 5d remove toner particles remained on the respective photoconductive drums 1a to 1d.

The intermediate transferring belt 8 is passed over a conveying roller 10 on the upstream and the driving roller 11 on the downstream. When the intermediate transferring belt 8 starts rotation in a clockwise direction in accordance with a rotation of the driving roller 11 by a driving motor (unillustrated), a recording sheet P is conveyed from the registration roller 12b at a predetermined timing to the transfer roller 9 provided adjacent to the intermediate transferring belt 8, and a full-color image is transferred to the recording sheet P. The recording sheet P on which the toner image is transferred is conveyed to the fixing device 7.

The recording sheet P conveyed to the fixing device 7 is heated and pressed by a fixing roller pair 13, and the full-color toner image is fixed on a surface of the recording sheet P. Consequently, a predetermined full-color image is formed. The conveyance direction of the recording sheet P on which the full-color image is formed is changed at a switching portion 14 in which a plurality of branch paths are joined. In the case where an image is formed only on one surface of the recording sheet P, the recording sheet P is directly discharged to the discharge tray 17 by the discharging roller 15.

On the other hand, in the case where images are formed on the both surfaces of the recording sheet P, the recording sheet P having passed through the fixing device 7 is allowed to go into a sheet-conveyance path 18 at the switching portion 14 and conveyed again to the transfer roller 9 in the state where the surface bearing the image is turned down. Then, a succeeding image formed on the intermediate transferring belt 5 is transferred to the other surface of the recording sheet P on which no image is formed. After the recording sheet is conveyed to the fixing device 7 at which the toner image is fixed, the recording sheet P is discharged to the discharge tray 17.

Figure 2:
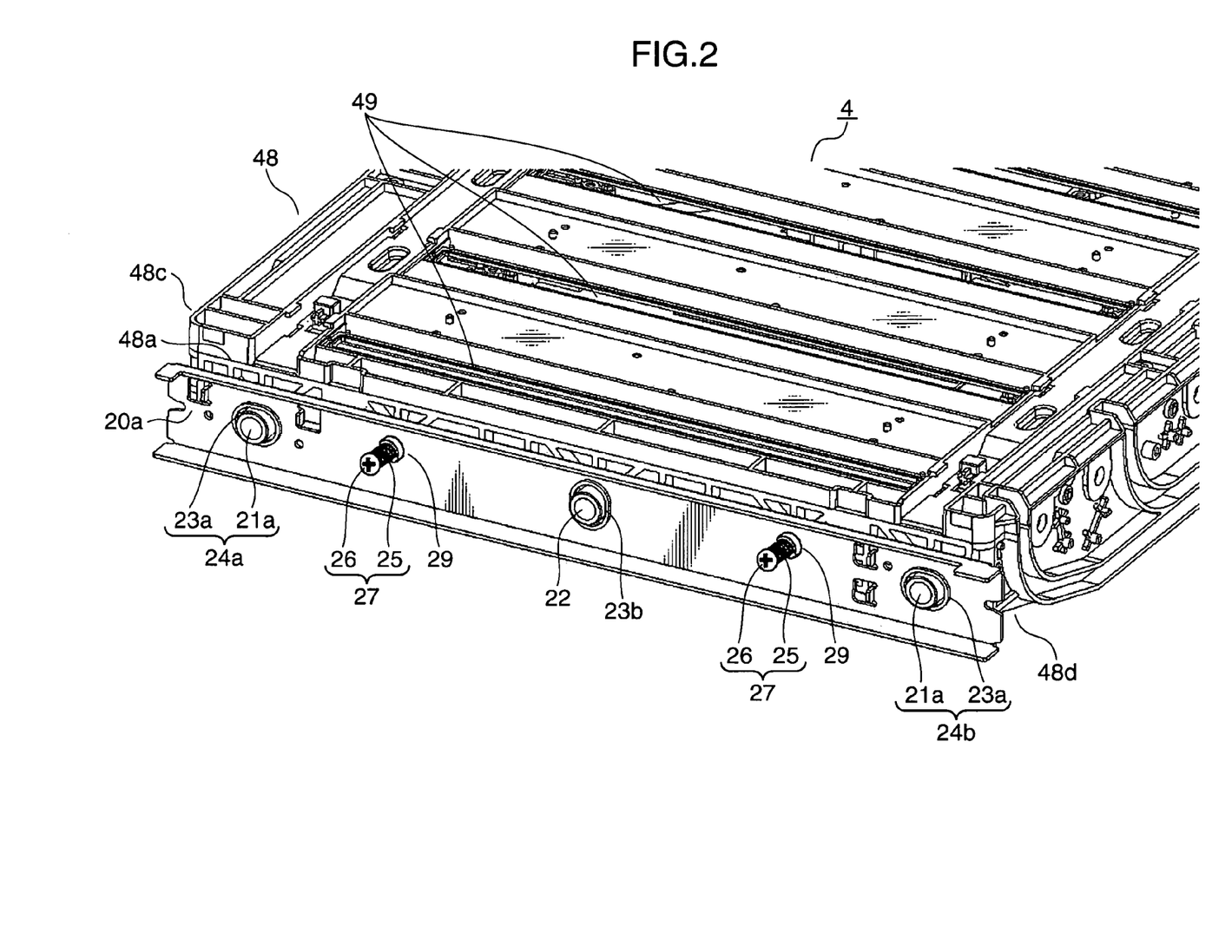
FIG. 2 is a perspective view showing a part of the optical scanning device, which is viewed from the downstream side (left hand side in FIG. 1) in a sheet conveyance direction.

FIG. 2 is an external perspective view showing the optical scanning device 4 which is viewed from the downstream (left hand side in FIG. 1) in the sheet conveyance direction. Here, the state is shown where the optical scanning device 4 is mounted to the image forming apparatus 100. A frame member 20a (first frame) attached to the image forming apparatus 100 is described. The frame member 20a supports a first elevation wall 48a of a housing 48 on the downstream in the sheet conveyance direction. A top cover is provided on an upper portion of the housing 48, and the top cover is formed with a plurality of windows 49 for allowing a laser light reflected from folding mirrors 45 (refer to FIG. 10) to go out to the photoconductive drums 1a to 1d (refer to FIG. 1).

Figure 10:
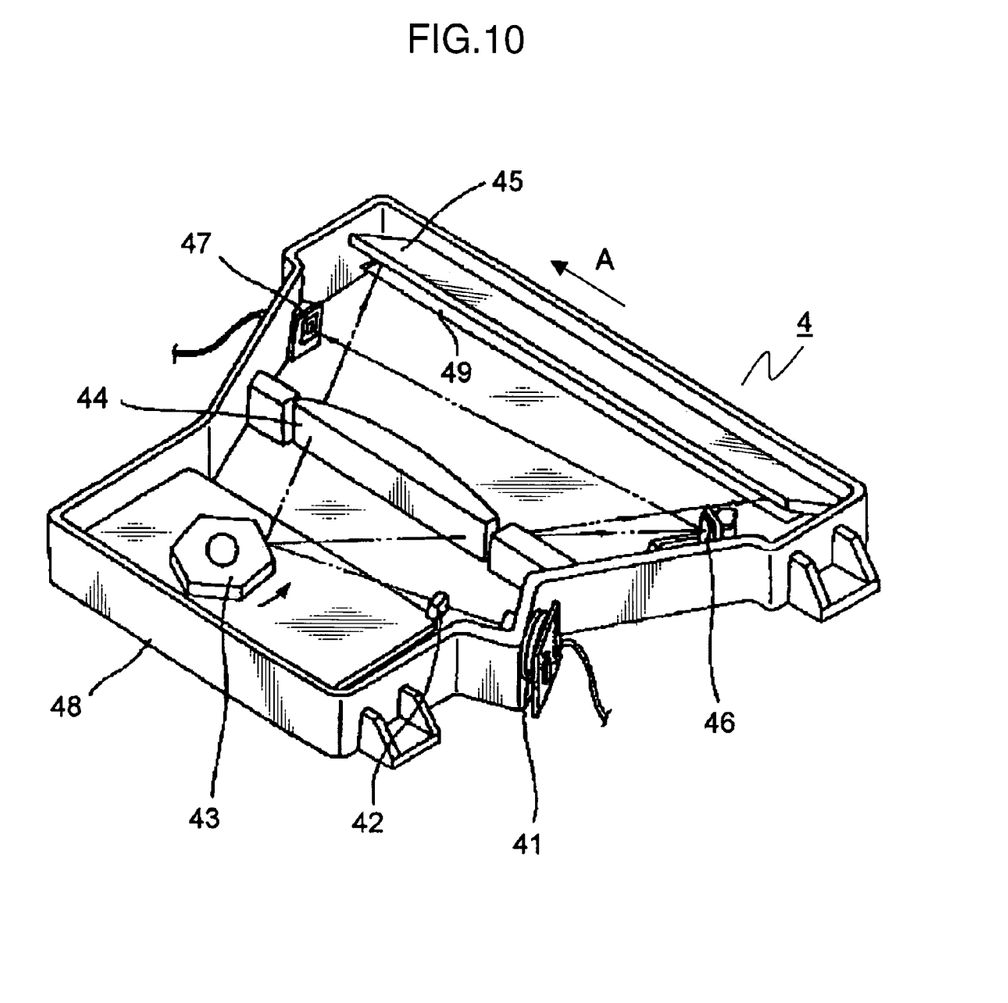
FIG. 10 is a perspective view schematically showing an internal configuration of the optical scanning device.

An internal configuration of the optical scanning device 4 will be described, referring to FIG. 10 showing the internal configuration of the optical scanning device. In FIG. 10, the optical scanning device 4 will be described in the case of a monochromatic image forming to simplify the description. The optical scanning device 4 includes a light source member 41 for irradiating a laser light beam and a scanning optical system for allowing the laser light beam to defectively scan the surfaces of the photoconductive drums 1a to 1d. The scanning optical system includes a cylindrical lens 42, a polygon mirror 43, a scanning lens 44 and a folding mirror 45. The color image forming is done in the similar arrangement.

Laser light rays emitted from the light source member 41 are focused into a linear light beam by the cylindrical lens 42, and the light beam is deflected in a predetermined scanning direction by the polygon mirror 43 as a deflector. The laser light beam is passed through the scanning lens 44 and reflected at the folding mirror 45 to the respective surfaces of the photoconductive drums 1a to 1d. The laser light beam scans the respective surfaces of the photoconductive drums 1a to 1d in a main scanning direction by a rotation of the polygon mirror 43 and in a sub-scanning direction by a rotation of the photoconductive drums 1a to 1d to thereby form an electrostatic latent image on the respective surfaces of the photoconductive drums 1a to 1d.

A part of the scanning light beam from the polygon mirror 43 is separated downward at one end of the scanning plane by the mirror 46, and led into a beam detection sensor 47. The scanning light beam led to the beam detection sensor 47 is converted to a scanning start signal by the beam detection sensor 47, and the signal is transmitted to a semiconductor laser (unillustrated) of the light source member 41. After receiving the scanning start signal, the semiconductor laser starts a writing modulation.

The light source member 41, the cylindrical lens 42, the polygon mirror 43 and a driving motor for driving the polygon mirror 43, the scanning lens 44, the folding mirror 45, the mirror 46 and the beam detection sensor 47 are mounted on an elevation wall and a bottom wall of the housing 48. Further, the top cover is provided on the upper portion of the housing 48.

The housing 48 has the shape of a box having a longer in the sheet conveyance direction, and serves as a supporting member for supporting the light source member 41 and the scanning optical system. The housing 48 has a first elevation wall 48a on the downstream in the sheet conveyance direction, and a second elevation wall 48b on the upstream in the sheet conveyance direction (refer to FIGS. 4 and 5) and facing the first side surface 48a. Further, the housing 48 has four corner portions. Corner portions 48c, 48d are on opposite ends of the first elevation wall 48a as shown in FIG. 2.

On the elevation wall 48a of the housing 48, two support bosses 21a (first bosses) and a positioning boss 22 are projectingly provided. The two support bosses 21a are engaged with two engagement holes 23a (first engagement holes) formed in the frame member 20a, respectively. Further, the positioning boss 22 is engaged with an engagement hole 23b (positioning hole) formed in the frame member 20a.

The engagement holes 23a to be engaged with the support bosses 21a on the left and right are prolonged in the horizontal direction, and the engagement hole 23b to be engaged with the positioning boss 22 at the center is prolonged in the vertical direction. The engagement holes 23a, 23b meet the support bosses 21 and the positioning boss 22 respectively along a direction perpendicularly intersecting the longitudinal direction of the housing 48 at a tolerance. Accordingly, the housing 48 is supported on the frame member 20a while the bosses 21a is kept from moving in the vertical direction and the boss 21b is kept from moving in the horizontal direction. The support bosses 21a and the engagement holes 23a constitute first support portions 24a, 24b for supporting the first elevation wall 48a at the two points.

Figure 3:
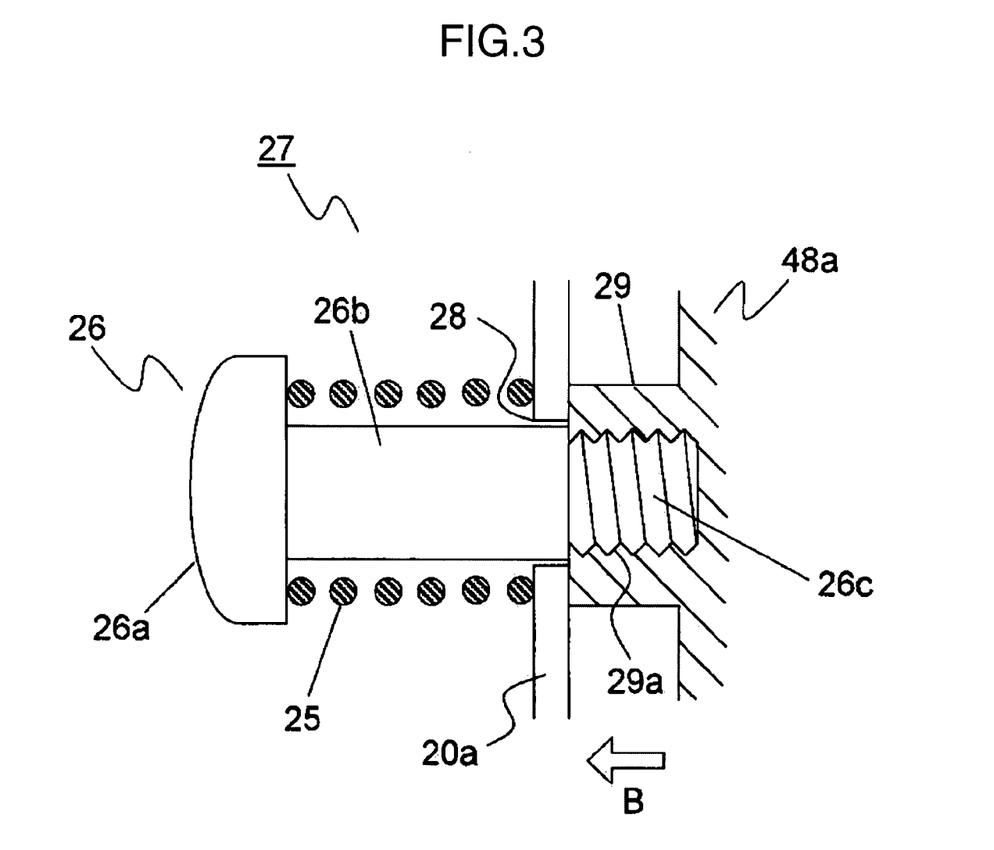
FIG. 3 is an enlarged sectional view showing a forcible contact mechanism in the optical scanning device.

At the two positions on the first elevation wall 48a that is closer to the center than the support bosses 21a on the left and right, there are projectingly provided fixing bosses 29 each formed with a threaded hole 29a (refer to FIG. 3). A bolt member 26 or projecting member is screwed into each of the fixing bosses 29 while passing through an expansion spring 25 and the frame member 20a. The expansion spring 25 and the bolt member 26 constitute a forcible contact mechanism 27 for generating a biasing force urging the first elevation wall 48a onto the frame member 20a.

Here, the first support portions 24a, 24b are provided together on the first elevation wall 48. However, one of the two first support portions 24a, 24b may be provided on an extension portion of the frame member and a wall of the housing which extends along a direction perpendicularly intersecting the first elevation wall 48a. In other words, one of the first support portions 24a, 24b may be provided at a position close to the corner portion 48c or 48d adjacent to the elevation wall 48a of the housing 48.

FIG. 3 is an enlarged view showing a cross-section of the forcible contact mechanism 27. As shown in FIG. 3, the bolt member 26 (projecting member) has a large-diameter head portion 26a (projected leading end) and a shaft portion 26b having a diameter smaller than that of the head portion 26a. The bolt member 26 passes through the expansion spring 25 having a diameter smaller than that of the head portion 26a but larger than that of the shaft portion 26. A circular hole 28 is formed in the frame member 20a, and has a diameter substantially the same as that of the shaft portion 26b. A screw portion 26c is formed on the other end portion of the bolt member 26 is screwed into the threaded hole 29a formed in the fixing boss 29.

One end of the expansion spring 25 is on the head portion 26a, and the other end is on the frame member 20a. The length of the shaft portion 26b is shorter than the natural length of the expansion spring 25. The compressed 25, which is placed between the head portion 26a and the frame member 20a is compressed against the expandable force as the screw portion 26c is screwed in the threaded hole 29a.

Thus, a biasing force is generated in a horizontal direction in FIG. 3 by the expansion spring 25. However, the frame member 20a is fixedly attached to the main body of the image forming apparatus 100, and the housing 48 is consequently imparted with a force in a direction of an arrow B. Accordingly, the first elevation wall 48a is pulled to the frame member 20a and come in forcible contact with the frame member 20a. In other words, the forcible contact of the first elevation wall 48a with the frame member 20a restricts a movement of the housing 48 in the sheet conveyance direction. In place of the expansion spring 25, there may be used a plate spring, a contraction spring or the like to allow the first elevation wall 48a to come in forcible contact with the frame member 20a.

Figure 4:
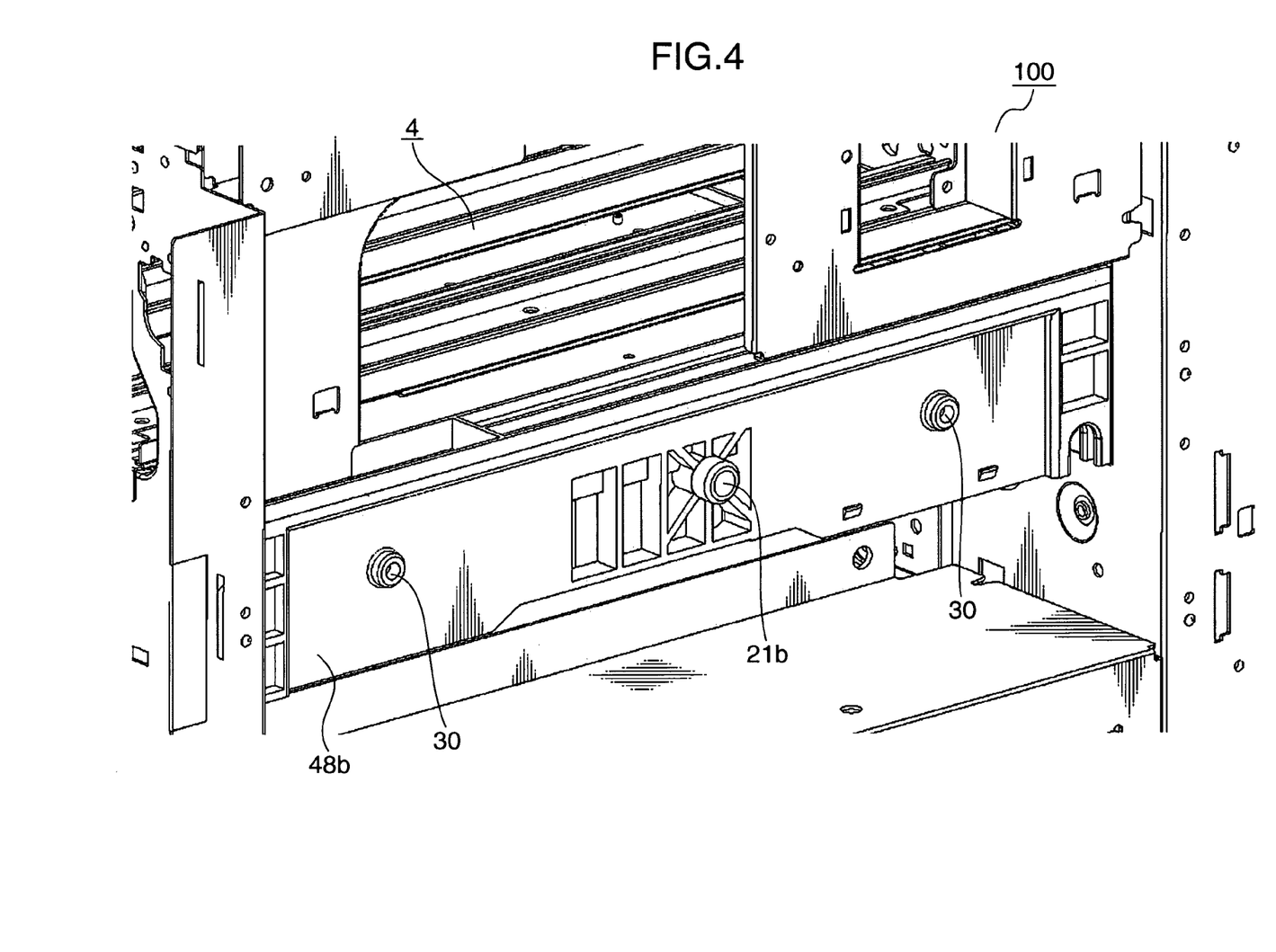
FIG. 4 is a perspective view showing a part of the optical scanning device, which is viewed from the upstream side (right hand side in FIG. 1) in the sheet conveyance direction.

Next, supporting of the optical scanning device 4 on the upstream in the sheet conveyance direction (right hand side in FIG. 1) will be described. FIG. 4 is an external perspective view of the optical scanning device 4 which is viewed from the upstream. At an intermediate portion of the second elevation wall 48b facing the first elevation wall 48a (refer to FIG. 2), a support boss 21b (second boss) is projectingly provided, and projections 30 are provided at the left and right sides of the support boss 21b. The support boss 21b is attached with an adjusting mechanism (described herebelow) for adjusting a deviation of the housing 48 over the horizontal plane.

Figure 5:
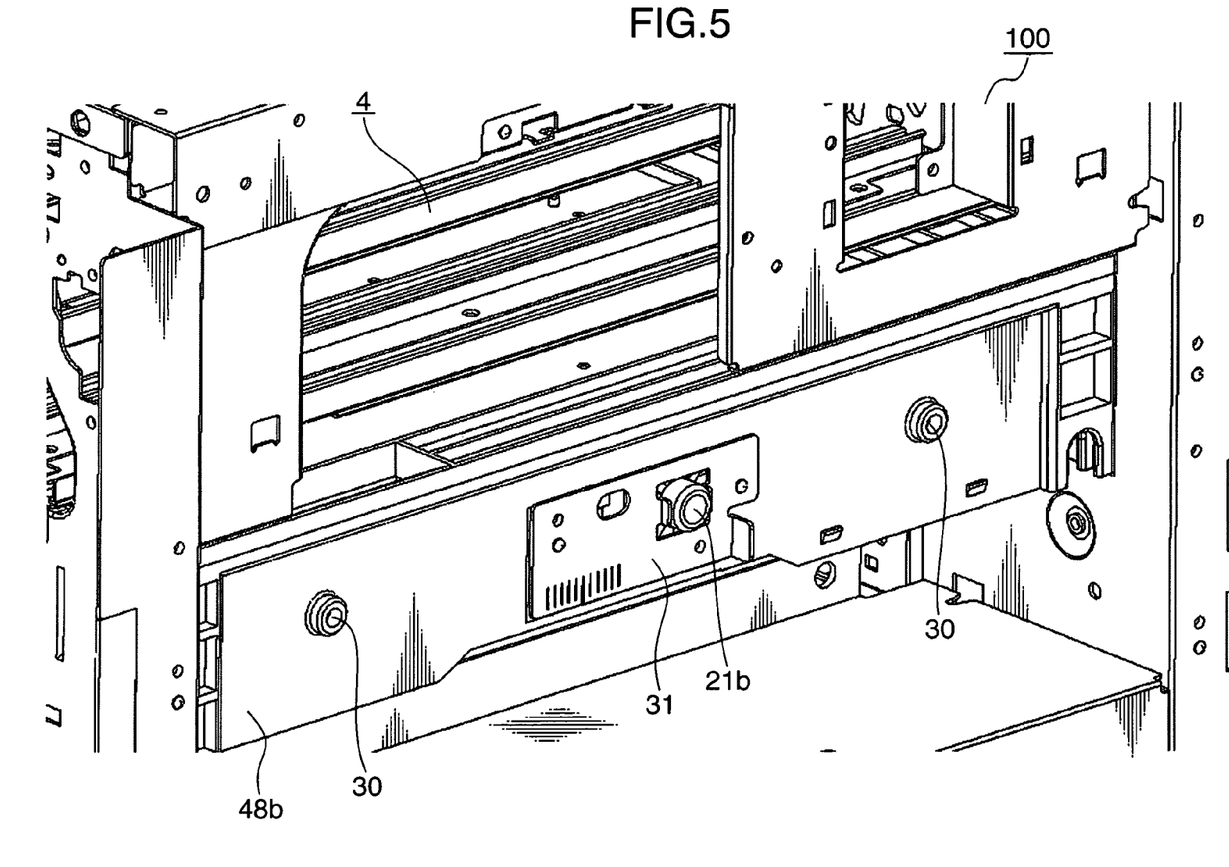
FIG. 5 is a perspective view similar to FIG. 4, showing a state where an adjusting member is mounted to the optical scanning device.
Figure 6:
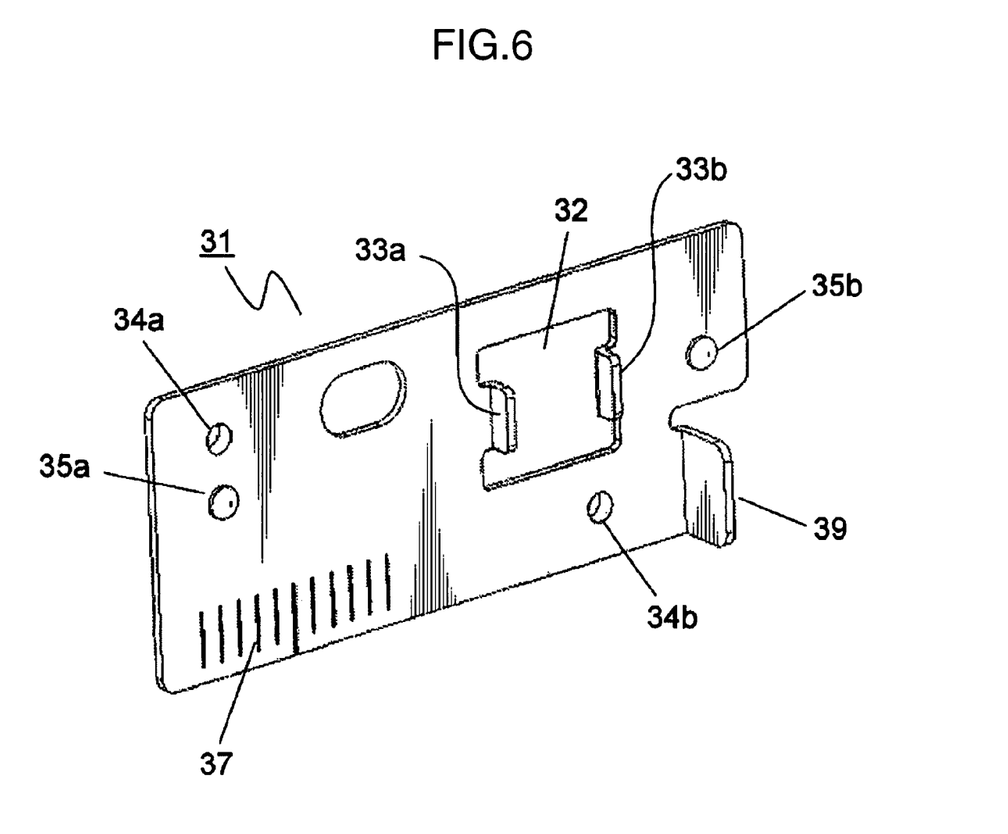
FIG. 6 is a perspective view of the adjusting member.
Figure 7:
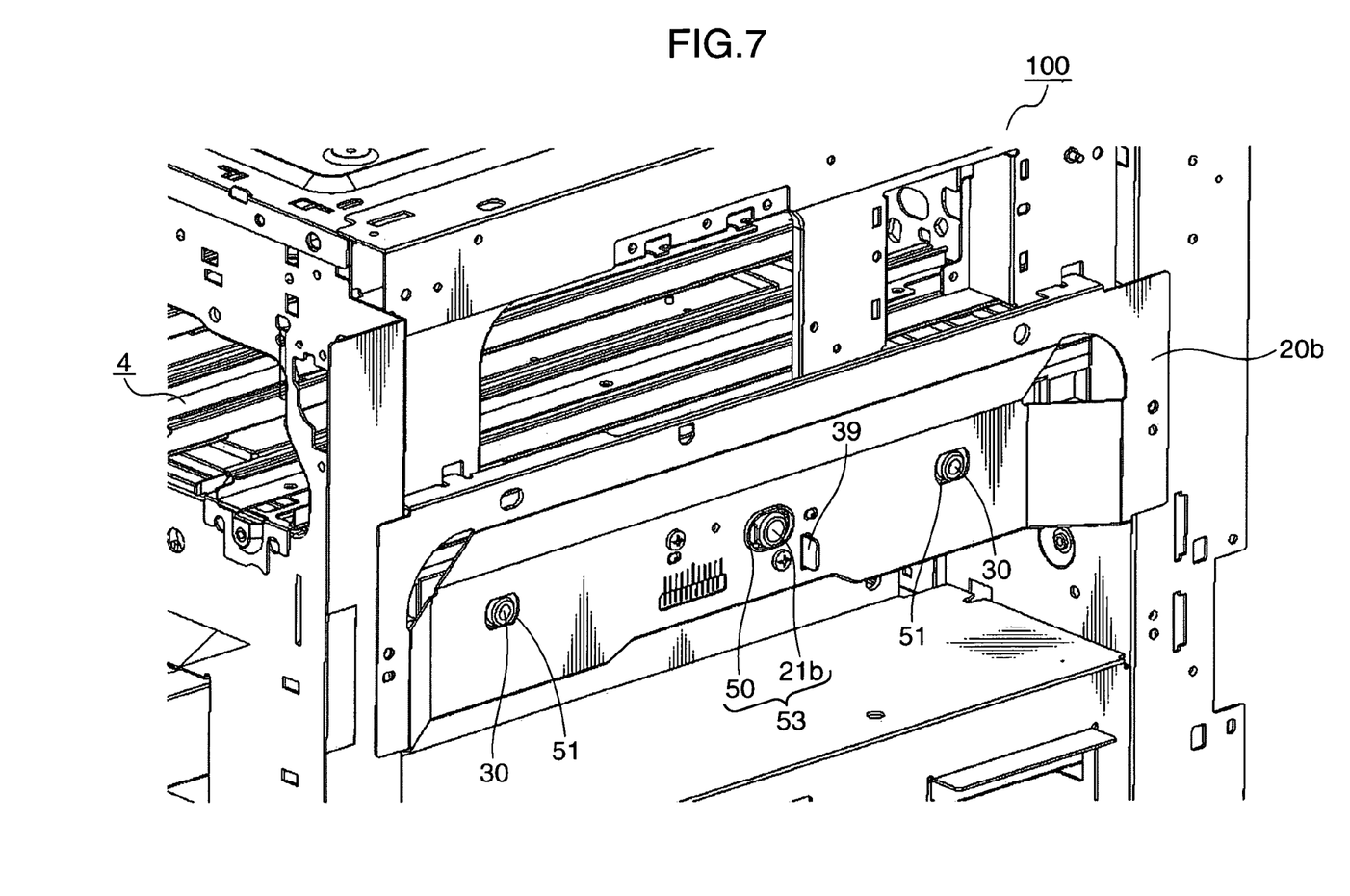
FIG. 7 is a perspective view similar to FIG. 4, showing a state where the optical scanning device is supported on a frame member.

FIG. 5 is an external perspective view showing the state where an adjusting member 31 is mounted on the support boss 21b. FIG. 6 is an enlarged perspective view showing the adjusting member 31. The adjusting member 31 is a metal plate having a rectangular shape. At a substantially central portion of the adjusting member 31, an opening 32 for allowing the supporting boss 21b to be inserted is formed. On the left and right sides of the opening 32, there are formed a pair of bent portions 33a, 33b. A vertical distance of the opening 32 and a distance between the bent portions 33a, 33b are substantially the same as the diameter of the support boss 21b, and the adjusting member 31 is not misaligned when it is mounted on the support boss 21b.

On the upper left and lower right portions of the adjusting member 31, there are formed threaded holes 34a, 34b for fixedly attaching the adjusting member 31 to the frame member 20b (refer to FIG. 7). Further, projections 35a, 35b are provided at two positions on the surface of the adjusting member 31. On the lower left portion of the adjusting member 31, a scale 37 is marked, and the lower right end portion is bent perpendicularly to define an operation portion 39 for sliding the adjusting member 31.

FIG. 7 is an external perspective view showing the state where the optical scanning device 4 is mounted to the main body of the image forming apparatus 100 and viewed from the upstream in the sheet conveyance direction (on the right in FIG. 1). The second elevation wall 48b (refer to FIG. 5) of the housing 48 is supported at the frame member 20b (second frame) facing the frame member 20a (refer to FIG. 2) on the main body of the image forming apparatus 100.

The support boss 21b is engaged with a horizontally prolonged engagement hole 50 (second engagement hole) formed in the frame member 20b at a predetermined tolerance in the vertical direction so that the housing 48 is positioned with respect to the vertical direction. The support boss 21b and the engagement hole 50 constitute a second support portion 53 for supporting the elevation wall 48b of the housing 48 at a single point.

Further, the right and left projections 30 pass through through-holes 51 formed in the frame member 20b, respectively. A predetermined clearance is made between the projection 30 and upper and lower end of the through-hole 51 to absorb a vibration or shock when the image forming apparatus 100 is transported, thereby keeping a misalignment and distortion of the housing 48 to occur.

Figure 8:
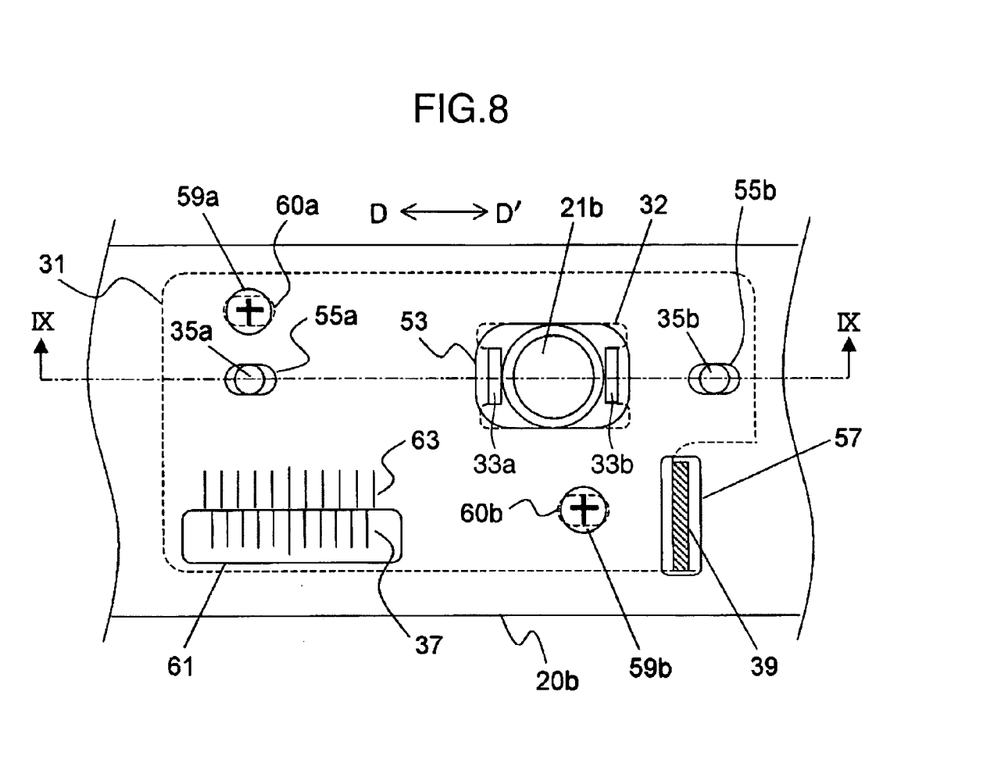
FIG. 8 is a front enlarged view showing a support boss and its peripheral configuration on the supporting frame member shown in FIG. 7.
Figure 9:
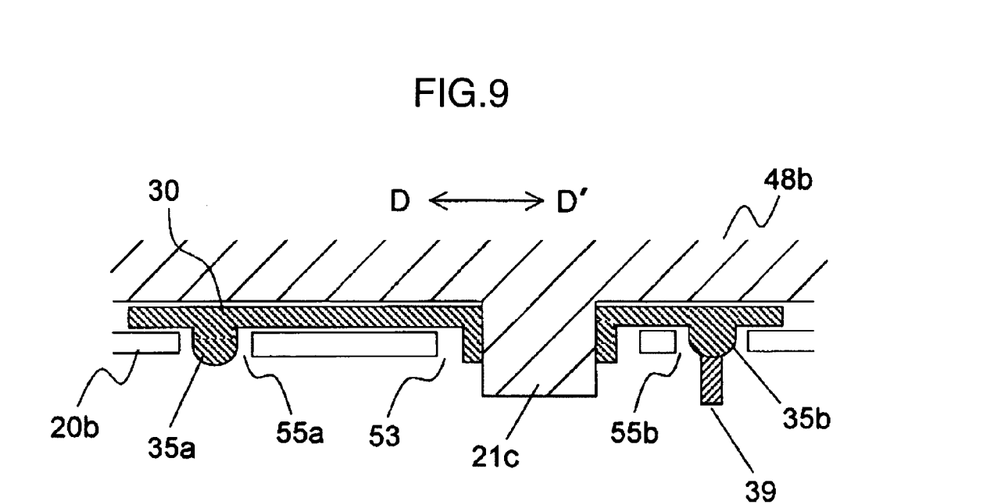
FIG. 9 is a sectional view taken along the line IX-IX in FIG. 8, showing the support boss and its peripheral configuration.

Next, a manner of adjusting a deviation of the housing 48 over the horizontal plane will be described in detail. FIG. 8 is a front enlarged view showing the support boss 21b and its peripheral configuration shown in FIG. 7. FIG. 9 is a sectional view taken along the line IX-IX, showing the support boss 21b and its peripheral configuration. The support boss 21b passing through the opening 32 of the adjusting member 31 is engaged with the engagement hole 50 of the frame member 20b. Further, the projections 35a, 35b engage with guide holes 55a, 55b respectively, and constitute a guide mechanism for allowing the adjusting member 31 to slide along the frame member 20b in the horizontal direction. The operation portion 39 projects through an operation hole 57 formed in the frame member 20b.

Further, fixing screws 59a, 59b are screwed into the threaded holes 34a, 34b (refer to FIG. 6) through elongate holes 60a, 60b formed in the frame member 20b. Here, the horizontal dimensions of the engagement hole 50, the guide holes 55a, 55b, the operation hole 57 and the elongate holes 60a, 60b define a maximum slidable range of the adjusting member 31.

Thus, when the adjusting member 31 is slid in a predetermined distance in a horizontal direction (direction of the arrow D or D' in FIG. 8), the second elevation wall 48b of the housing 48 to which the adjusting member 31 is attached moves the same distance in the horizontal direction. Accordingly, the expansion springs 25 of the forcible contact mechanism 27 (refer to FIG. 2) expands or contracts, and the elevation wall 48a partially moves away from the frame member 20a, thereby shifting the housing 48 a predetermined distance in the horizontal direction. Thereafter, the housing 48 is positioned at a specified position by screwing the fixing screws 59a, 59b.

Furthermore, the frame member 20b is provided with a window 61 (opening) for allowing a user to see the scale 37 provided on the surface of the adjusting member 31. The frame member 20b is provided with a scale 63 above the window 61 to correspond to the scale 37 of the adjusting member 31. The scale 63 on the frame member 20b is marked at a graduation pitch different from that of the scale 37. When the center index of the scale 37 agrees with the center index of the scale 63, the adjusting member 31 come into the center of the slidable range. As the index agreement shifts one by one in the horizontal direction from the center, the adjusting member 31 is represented to slide in the same horizontal direction a distance corresponding to a difference between the graduation pitch of the scale 37 and the graduation pitch of the scale 63.

A desirable adjustment pitch can be set by changing the respective graduation pitches of the scale 37 and 63. Further, when no variation occur in the adjustment of the optical scanning device 4 and the photoconductive drums 1a to 1d, the sliding amount of the adjusting member 31 becomes constant. Accordingly, the adjusting member 31 can be easily positioned by predetermining the agreement position of the scale 37 and the scale 61. Consequently, the production process can be further simplified.

According to the above-described configuration, the housing 48 of the optical scanning device 4 is supported in the horizontal state on the frame members 20a, 20b at the three points of the first support portions 24a, 24b provided at the two positions of the first elevation wall 48a and the second support portion 53 provided on the second elevation wall 48b. Accordingly, the housing 48 becomes less likely to be affected by deformation of the frame members 20a, 20b. Further, the first elevation wall 48a comes in forcible contact with the frame member 20a by the biasing force of the expansion springs 25, which is urged onto the frame member 20a. Also, the adjusting mechanism is provided on the second support portion 53. Accordingly, if each of the folding mirrors 45 (refer to FIG. 10) is adjusted so as to be horizontal at the time of assembling the optical scanning device 4, the deviation of the scanning light beam with respect to the photoconductive drums 1a to 1d (refer to FIG. 1) or the perpendicularity of an image can be adjusted just by adjusting the deviation of the housing 48 over the horizontal plane.

Here, the forcible contact mechanism 27 and the adjusting member 31 are respectively provided on the first elevation wall 48a and the second elevation wall 48b oppositely arranged in the longitudinal direction (sheet conveyance direction) of the housing 48. However, the forcible contact mechanism 27 and the adjusting member 31 may be provided respectively on opposite side elevation walls in the widthwise direction and connected with the first elevation wall 48a and the second elevation wall 48b. However, in the case that the adjusting mechanism is provided on the side elevation wall in the widthwise direction of the housing 48, the shifting amount of the housing 48 in comparison with an adjusting movement amount of the adjusting member 31 becomes great, consequently making it difficult to accomplish the fine deviation adjustment of the scanning light beam. Thus, it is preferable to provide the forcible contact mechanism 27 and the adjusting member 31 respectively on the first elevation wall 48a and the second elevation wall 48b on the oppositely arranged in the longitudinal direction as the present embodiment.

The present invention is not limited to the above-described embodiment, but various modifications can be made within a scope not departing from the meaning of the present invention. For example, the adjusting mechanism using the adjusting member 31 is merely one example. The adjusting mechanism, such as the shape of the adjusting member 31, may be desirably modified. Further, it is not necessarily needed to provide a vibration-proof mechanism including the projections 30 and the through holes 51 but may be so configured as not to provide projections 30 and through holes 51.

In the foregoing embodiment, furthermore, the optical scanning device is mounted to a tandem-type color image forming apparatus as an example, but the present invention is not limited to this. The optical scanning device may be mounted to a monochromatic copying machine to facilitate adjustment of the perpendicularity of an image, and improve the assembling workability of the image forming apparatus.

The above-described embodiment mainly includes the inventions having the following configurations.

An optical scanning device according to one aspect of the present invention comprises: a light source member for irradiating a light beam; a scanning optical system for allowing the light beam to defectively scan a surface to be scanned; a housing for supporting the light source member and the scanning optical system, the housing including a first elevation wall and a second elevation wall facing the first elevation wall; a first frame facing the first elevation wall of the housing or a part near the first elevation wall; a second frame facing the second elevation wall of the housing; a first support portion for supporting the first elevation wall or the part near the first elevation wall with the first frame at two points; a second support portion for supporting the second elevation wall with the second frame at a single point; a forcible contact mechanism for generating a biasing force for urging the first elevation wall onto the first frame; and an adjusting mechanism provided in the second support portion for adjusting a deviation of the housing over a horizontal plane.

According to this configuration, the housing of the optical scanning device is supported on the first and second frames at the three points, that is, the first support portions on the first elevation wall and the second support portion provided on the second elevation wall. Further, there are provided the forcible contact mechanism for generating a biasing force for urging the first elevation wall onto the first frame, and the adjusting mechanism operable to adjust a deviation of the housing over a horizontal plane. Accordingly, an optical scanning device becomes less likely to be affected by distortion of the frames, and the deviation of the scanning light beam with respect to the scanning surface can be adjusted by adjusting a deviation of the housing. Consequently, an optical scanning device which can eliminate the distortion of the housing due to an adjusting operation can be provided easily and at a lower cost.

In the above-described arrangement, it is preferable that the housing includes the shape of a box having a longitudinal direction and a widthwise direction, and the first elevation wall and the second elevation wall are on opposite ends in the longitudinal direction of the housing.

According to this arrangement, the amount of adjustment, i.e., a change in the direction of a scanning light beam in comparison to a rotating amount of the housing can be made smaller. Accordingly, the deviation of the scanning light beam can be finely adjusted.

In the above-described arrangement, the forcible contact mechanism may include a spring engaged with the first frame for generating the biasing force. In this case, it is preferable that the forcible contact mechanism includes: a projecting member having one end fixedly attached to the first elevation wall and the other end passing through and projecting from the first frame; and an expansion spring having one end engaged with a leading end of the projecting member and the other end engaged with the first frame.

According to this arrangement, the biasing force can be generated in a simple configuration using a spring (expansion spring).

In the above-described arrangement, it is preferable that the first support portion includes: two first bosses provided on the first elevation wall and spaced apart from each other; and two first engagement holes formed in the first frame for passing the respective first bosses therethrough.

According to this arrangement, the first support portion can be arranged with a simple and assured configuration of engaging the two first bosses and two first engagement holes.

In this case, it is preferable that a positioning boss is further provided with a positioning boss between the two first bosses, the first frame is further formed with a positioning hole for passing the positioning boss therethrough, and the first engagement hole is prolonged in a horizontal direction, and the positioning hole is prolonged in a vertical direction.

According to this arrangement, the housing is supported on the first frame at the first bosses with respect to the vertical direction, and kept by the positioning boss with respect to the horizontal direction.

In the above-described arrangement, the second support portion may include a second boss provided on the second elevation wall; and a second engagement hole for passing the second boss therethrough.

According to this arrangement, the second support portion can be arranged with a simple and assured configuration with the engagement of one second boss and one second engagement hole.

In this case, it is preferable that the second engagement hole is prolonged in a horizontal direction, and the adjusting mechanism includes: an adjusting member to be attached to the second boss; and a screw for fixing the adjusting member to the second frame member. According to this arrangement, an adjusting mechanism becomes simpler in structure and lower in cost.

Further, it is preferable that the adjusting member includes: an operation portion provided between the second elevation wall and the second frame member and projecting toward the second frame member; and a scale, and the second frame member is formed with an operation hole for passing the operation portion slidably therethrough and an opening window for allowing a user to see the scale.

According to this arrangement, the adjusting member can be adjusted expeditiously and accurately by sliding the operation portion while confirming the scale through the opening window.

An image forming apparatus according to other aspect of the present invention includes: an image bearing member for bearing a toner image corresponding to an electrostatic latent image; and an optical scanning device for irradiating a light beam to a surface of the image bearing member to form an electrostatic latent image. The optical scanning device has the above-described configuration.

According to this arrangement, the optical scanning device having the above-described configuration is mounted on the image forming apparatus. In this image forming apparatus, the adjustment of a perpendicularity of an image can be realized with a simple configuration. Especially in a color image forming apparatus, a deviation of the scanning light beam can be easily adjusted without adjusting a plurality of mirrors individually. Accordingly, the assembling operation can be improved.

This application is based on Japanese Patent application serial no. 2006-154526 filed in Japan Patent Office on Jun. 2, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical scanning device comprising:
a light source member for irradiating a light beam;
a scanning optical system for allowing the light beam to deflectively scan a surface to be scanned;
a housing for supporting the light source member and the scanning optical system, the housing including a first elevation wall and a second elevation wall facing the first elevation wall;
a first frame facing the first elevation wall of the housing or a part near the first elevation wall;
a second frame facing the second elevation wall of the housing;
a first support portion for supporting the first elevation wall or the part near the first elevation wall with the first frame at two points;
a second support portion for supporting the second elevation wall with the second frame at a single point;
a forcible contact mechanism for generating a biasing force for urging the first elevation wall onto the first frame; and
an adjusting mechanism provided in the second support portion for adjusting a deviation of the housing over a horizontal plane.

2. The optical scanning device according to claim 1, wherein the housing includes the shape of a box having a longitudinal direction and a widthwise direction, and the first elevation wall and the second elevation wall are on opposite ends in the longitudinal direction of the housing.

3. The optical scanning device according to claim 1, wherein the forcible contact mechanism includes a spring engaged with the first frame for generating the biasing force.

4. The optical scanning device according to claim 3,
wherein the forcible contact mechanism includes:
a projecting member having one end fixedly attached to the first elevation wall and the other end passing through and projecting from the first frame; and
an expansion spring having one end engaged with a leading end of the projecting member and the other end engaged with the first frame.

5. The optical scanning device according to claim 1,
wherein the first support portion includes:
two first bosses provided on the first elevation wall and spaced apart from each other; and
two first engagement holes formed in the first frame for passing the respective first bosses therethrough.

6. The optical scanning device according to claim 5,
wherein:
the first elevation wall further includes a positioning boss between the two first bosses;
the first frame further includes a positioning hole for passing the positioning boss therethrough; and
the first engagement hole is prolonged in a horizontal direction, and the positioning hole is prolonged in a vertical direction.

7. The optical scanning device according to claim 1,
wherein the second support portion includes:
a second boss provided on the second elevation wall; and
a second engagement hole formed in the second frame for passing the second boss therethrough.

8. The optical scanning device according to claim 7,
wherein:
the second engagement hole is prolonged in a horizontal direction; and
the adjusting mechanism includes:
an adjusting member to be attached to the second boss; and
a screw for fixing the adjusting member to the second frame member.

9. The optical scanning device according to claim 8,
wherein:
the adjusting member includes:
an operation portion provided between the second elevation wall and the second frame member and projecting toward the second frame member; and
a scale, and
the second frame member is formed with an operation hole for passing the operation portion slidably therethrough and an opening window for allowing a user to see the scale.

10. An image forming apparatus comprising:
an image bearing member for bearing a toner image corresponding to an electrostatic latent image; and
an optical scanning device for irradiating a beam to a surface of the image bearing member to form an electrostatic latent image,
wherein the optical scanning device includes:
a light source member for irradiating a light beam;
a scanning optical system for allowing the light beam to deflectively scan a surface to be scanned;
a housing for supporting the light source member and the scanning optical system, the housing including a first elevation wall and a second elevation wall facing the first elevation wall;
a first frame facing the first elevation wall of the housing or a part near the first elevation wall;
a second frame facing the second elevation wall of the housing;
a first support portion for supporting the first elevation wall or the part near the first elevation wall with the first frame at two points;
a second support portion for supporting the second elevation wall with the second frame at a single point;
a forcible contact mechanism for generating a biasing force for urging the first elevation wall onto the first frame; and
an adjusting mechanism provided in the second support portion for adjusting a deviation of the housing over a horizontal plane.

11. The image forming apparatus according to claim 10, wherein the housing includes the shape of a box having a longitudinal direction and a widthwise direction, and the first elevation wall and the second elevation wall are on opposite ends in the longitudinal direction of the housing.

12. The image forming apparatus according to claim 10, wherein the forcible contact mechanism includes a spring engaged with the first frame for generating the biasing force.

13. The image forming apparatus according to claim 12,
wherein the forcible contact mechanism includes:
a projecting member having one end fixedly attached to the first elevation wall and the other end passing through and projecting from the first frame; and
an expansion spring having one end engaged with a leading end of the projecting member and the other end engaged with the first frame.

14. The image forming apparatus according to claim 10,
wherein the first support portion includes:
two first bosses provided on the first elevation wall and spaced apart from each other; and
two first engagement holes formed in the first frame for passing the respective first bosses therethrough.

15. The image forming apparatus according to claim 14,
wherein:
the first elevation wall further includes a positioning boss between the two first bosses;
the first frame further includes a positioning hole for passing the positioning boss therethrough; and the first engagement hole is prolonged in a horizontal direction, and the positioning hole is prolonged in a vertical direction.

16. The image forming apparatus according to claim 10, wherein the second support portion includes:

a second boss provided on the second elevation wall; and a second engagement hole formed in the second frame for passing the second boss therethrough.

17. The image forming apparatus according to claim 16, wherein:

the second engagement hole is prolonged in a horizontal direction; and the adjusting mechanism includes:

an adjusting member to be attached to the second boss; and a screw for fixing the adjusting member to the second frame member.

18. The image forming apparatus according to claim 17, wherein:

the adjusting member includes:

an operation portion provided between the second elevation wall and the second frame member and projecting toward the second frame member; and a scale, and the second frame member is formed with an operation hole for passing the operation portion slidably therethrough and an opening window for allowing a user to see the scale.

* * * * *